(12) United States Patent
Van Houten et al.

(10) Patent No.: US 8,255,124 B2
(45) Date of Patent: Aug. 28, 2012

(54) ENHANCED SEAT BELT/ACCELERATOR BEHAVIORAL SYSTEM

(76) Inventors: Ronald Van Houten, Kalamazoo, MI (US); Richard Schulman, Kalamazoo, MI (US); Jeffrey Tenebaum, West Bloomfield, MI (US)

( * ) Notice: Subject to any disclaimer, the term of this patent is extended or adjusted under 35 U.S.C. 154(b) by 0 days.

(21) Appl. No.: 13/408,399

(22) Filed: Feb. 29, 2012

(65) Prior Publication Data
US 2012/0158251 A1 Jun. 21, 2012

Related U.S. Application Data

(63) Continuation-in-part of application No. 13/085,609, filed on Apr. 13, 2011, now abandoned, which is a continuation of application No. 12/113,715, filed on May 1, 2008, now Pat. No. 7,937,202.

(60) Provisional application No. 60/915,258, filed on May 1, 2007.

(51) Int. Cl.
*B60R 22/00* (2006.01)
*E05F 15/00* (2006.01)
*G05D 1/00* (2006.01)
*G05D 3/00* (2006.01)
*G06F 7/00* (2006.01)
*G06F 17/00* (2006.01)

(52) U.S. Cl. ............... 701/49; 701/36; 701/45; 701/70; 340/457; 340/457.1; 74/512; 74/513; 180/271

(58) Field of Classification Search ............... 701/36, 701/45–47, 49, 70; 180/269, 271, 281, 282, 180/286; 280/734, 735; 340/457, 457.1; 297/463.2, 468; 74/512, 513
See application file for complete search history.

(56) References Cited

U.S. PATENT DOCUMENTS

| | | | |
|---|---|---|---|
| 3,815,086 A | 6/1974 | Minton et al. | |
| 4,319,658 A * | 3/1982 | Collonia et al. | 180/271 |
| 5,172,785 A * | 12/1992 | Takahashi | 180/271 |
| 6,750,764 B1 | 6/2004 | Henninger | |
| 6,766,713 B2 * | 7/2004 | Sundaresan et al. | 74/512 |
| 6,977,582 B2 * | 12/2005 | Ota et al. | 340/457.1 |
| 7,005,976 B2 | 2/2006 | Hagenbuch | |
| 7,093,515 B2 * | 8/2006 | Yamanoi et al. | 74/513 |
| 7,343,234 B2 * | 3/2008 | Kameyama | 701/36 |
| 7,565,230 B2 * | 7/2009 | Gardner et al. | 701/32.7 |
| 7,686,119 B2 | 3/2010 | Greene | |
| 2007/0213916 A1 * | 9/2007 | Sugano et al. | 701/96 |
| 2010/0299037 A1 | 11/2010 | Sakaguchi et al. | |
| 2011/0004387 A1 | 1/2011 | Sugano et al. | |
| 2011/0190999 A1 | 8/2011 | Van Houten et al. | |

* cited by examiner

*Primary Examiner* — Hussein Elchanti
*Assistant Examiner* — Rami Khatib
(74) *Attorney, Agent, or Firm* — Dickinson Wright PLLC

(57) ABSTRACT

A method of controlling the behavior of an occupant of a vehicle (20) includes sensing an auxiliary mode of the vehicle (20) and comparing a first vehicle operation mode to a predetermined threshold to determine a first incident. The method proceeds by actuating a resistive device in response to the first incident to apply a resistance to an operational input by an occupant of the vehicle. The method is characterized by monitoring a second vehicle operation mode of the vehicle subsequent to the first incident and adjusting the applied resistance in proportion to the second vehicle operation mode. The second vehicle operation mode can include monitoring the distance traveled by the vehicle, monitoring the speed or acceleration of the vehicle, monitoring the time of vehicle mobilization, or monitoring a first period of time since the first incident.

25 Claims, 5 Drawing Sheets

ENHANCED SEAT BELT/ACCELERATOR BEHAVIORAL SYSTEM

CROSS REFERENCE TO RELATED APPLICATION

This application is a continuation-in-part of application Ser. No. 13/085,609 filed on Apr. 13, 2011, now abandoned which is a continuation of Ser. No. 12/113,715, now U.S. Pat. No. 7,937,202 filed on May 1, 2008, all of which claim priority to provisional application Ser. No. 60/915,258 filed on May 1, 2007.

BACKGROUND OF THE INVENTION

1. Field of the Invention

The subject invention relates to a method of controlling the behavior of an occupant of a vehicle with a resistive device and a control module and sensors to encourage compliance with an auxiliary mode.

2. Description of the Prior Art

Several methods are known which control the behavior of an occupant to encourage compliance with an auxiliary mode. Once such example is U.S. Pat. No. 7,093,515 to Yamanoi, et al, which discloses sensing a mobilization of the vehicle and sensing an auxiliary mode of the vehicle in response to the vehicle mobilization to identify an absence of the auxiliary mode. The method of Yamanoi proceds by monitoring a first vehicle operation mode of the vehicle, comparing the first vehicle operation mode to a predetermined first threshold to determine a first incident of the vehicle in response to the first vehicle operation mode exceeding the first threshold and then actuating the resistive device in response to the absence of the auxiliary mode and the first incident to apply a resistance to an operational input of the vehicle.

However, the prior art methods struggle at effectively encouraging the auxiliary mode through the use of the applied resistance without burdening or annoying the occupant under circumstances where the auxiliary mode would not beneficial. In other words, the prior art methods are inadequate because they fail to encourage an occupant to comply with the auxiliary mode only to the extent that is needed in a specific situation. For example, the amount of encouragement required by some vehicle occupants would be an unacceptable intrusion to other occupants who require only a mild encouragement, such as a reminders.

SUMMARY OF THE INVENTION

The subject invention provides for monitoring a second vehicle operation mode of the vehicle subsequent to the first incident and adjusting the applied resistance in response to the second vehicle operation mode.

ADVANTAGES OF THE INVENTION

The subject invention is advantageous because it provides for a gradual application of resistance in response to the second vehicle operation mode so that the level of resistance can be increased until the encouragement is effective for each specific vehicle occupant. As a result, the application of the applied resistance is no more than necessary to effectively encourage compliance with the auxiliary mode. Said another way, as the occupant ignores the applied resistance, the resistance becomes proportionally more insistent or resistance in response to the second vehicle operating mode. Ultimately, the subject invention increases the level of effectiveness of the applied resistance as well as improves the acceptance of the applied resistance by the public.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
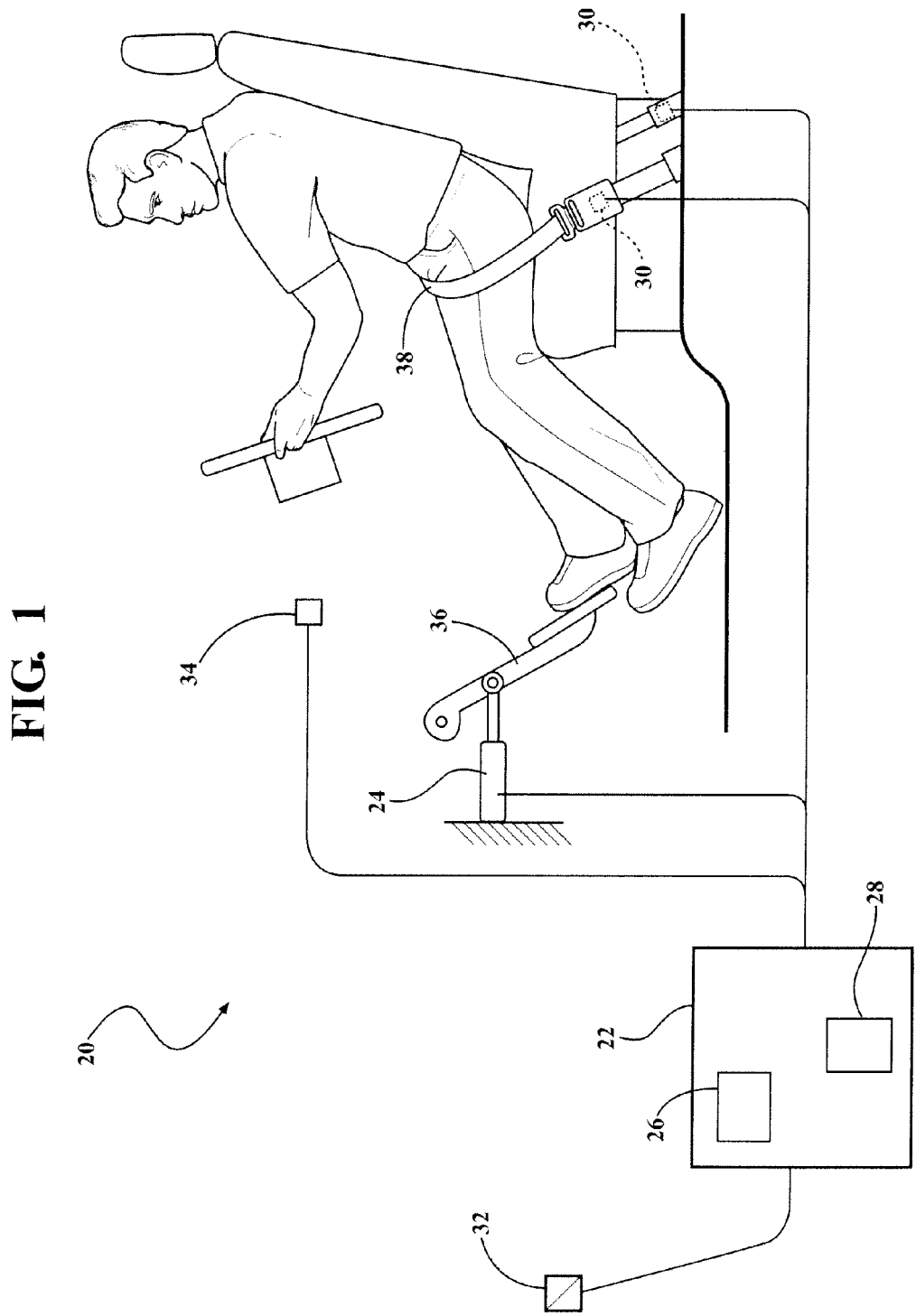
FIG. 1 illustrates a vehicle having a resistive device and a control module and a plurality of sensors for use in conjunction with the subject method of controlling a behavior of an occupant of the vehicle.

Referring to the Figures, wherein like numerals indicate like or corresponding parts throughout the several views, a vehicle 20 for use with a method of controlling the behavior of an occupant is shown in FIG. 1. The vehicle 20 could be one that travels across the ground, on tracks, on or under the water, or one that flies. The vehicle 20 is of the type including a control module 22, and a resistive device 24, and a plurality sensors 26, 28, for sensing a plurality of operating conditions as well as an auxiliary mode. As shown in FIG. 1, the control module 22 is configured to receive signals and data from the plurality of sensors 26, 28, 30 and is also capable of processing the data and producing signals in response to the data according to a program stored on the control module 22 which directs its operation. For example, the control module 22 can include a comparator 32, where data that has been stored in the program can be compared and resolved, as well as for use in relating one set of data to another set of data to establish ratios that the control module can use in performing subsequent commands. In addition, the comparator 32 is configured to count events, store the received data and perform calculations on the received data. The control module 22 also includes a signal generator 34 whereby it can send signal commands to various actuators. An example of this type of control module 22 could include the ECU (engine control unit) on a contemporary automobile that receives signals from sensors located on the engine and other parts of the automobile, and uses this information to command certain vehicle components to adjust their operation, such as increasing air-fuel mixture into the engine.

Figure 2:
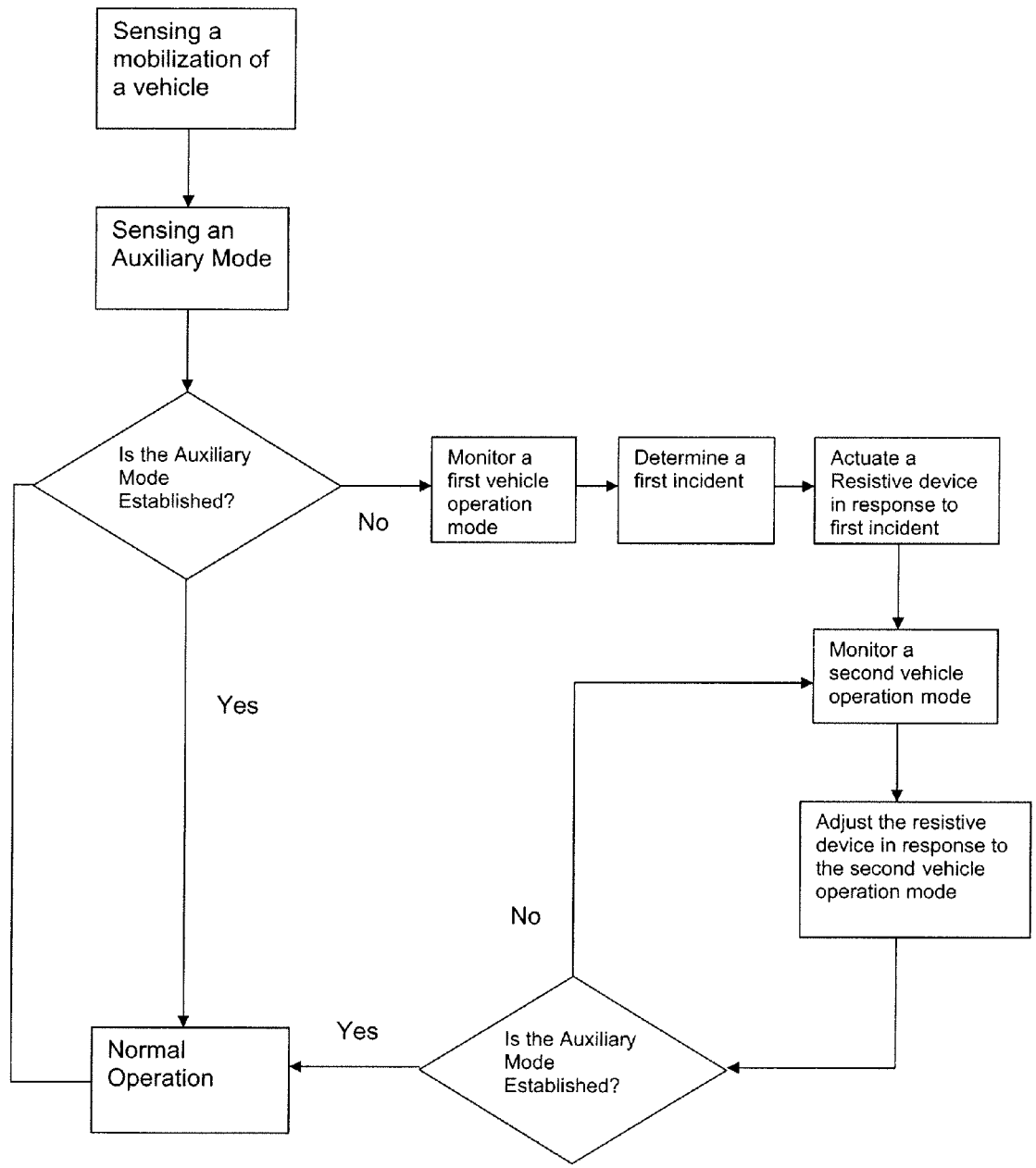
FIG. 2 is a flow diagram of a preferred embodiment of the method which illustrates monitoring a second vehicle operation mode of the vehicle subsequent to a first incident and adjusting the applied resistance in proportion to the second vehicle operating mode.

As shown in FIG. 2, the method of controlling the behavior of the occupant includes the steps of sensing a mobilization of the vehicle, such as that which may result from an application of an operational input of force by the occupant to an accelerator 36 in the vehicle. The accelerator 36 may be a pedal, lever, or toggle generating rotational motion or translational motion that communicates either mechanically or electronically, directly or indirectly (as through a control module 22 that receives multiple inputs) to a fluid delivery system (for example a throttle, or fuel pump) or an electric power supply in order to change the power output of a motor or engine. For example, in a typical automobile, the accelerator 36 is a foot pedal, and when an occupant of the vehicle depresses it, a cable connected to the pedal opens the throttle of the engine, which allows more air-fuel mixture to flow into the engine, which increases the power output of the engine. As is well known, the occupant of the vehicle typically applies a force to the accelerator 36 by hand or by foot to increase a speed of the vehicle 20 in proportion to the applied force.

In the preferred embodiment, the plurality of sensors 26, 28, 30 include a speed sensor 26 for sensing a vehicle speed that results from the application of force to the accelerator, and may be of the type commonly used on automobiles where the rotational speed of a rotating member (for example a wheel disk, or transmission output shaft) is measured, a pressure-differential type used by aircraft and watercraft, or a comparative positioning device that uses change in location measured by a satellite to calculate speed. In response to sensing a mobilization of the vehicle, the method proceeds by sensing an auxiliary mode of the vehicle 20 to identify an absence of the auxiliary mode. The auxiliary mode includes any desired vehicle operation condition of which compliance by the occupant of the vehicle is required or desired during operation of the vehicle. For example, the auxiliary mode of the vehicle can include sensing whether or not an auxiliary device, such as a seat belt 38 or a gas cap, is in an engaged position. In this embodiment, the plurality of sensors can include a sensor 30 for sensing if the seat belt is fastened or if the gas cap is closed. However, as mentioned above, the auxiliary mode can also include the sensing of any additional auxiliary devices or the sensing of any additional behaviors that warrant encouragement of engagement for participation by the occupant to establish safe vehicle operation. For example, the sensor 30 for sensing if the seat belt of a driver is fastened can also include a sensor 30 to sense if the seat belt of a passenger is also fastened.

In the situation where the auxiliary mode includes a sensing of a seat belt 38, the seat belt 38 can be of the well-known type including a system of straps anchored securely in the vehicle 20 to maintain a vehicle occupant in a position within the vehicle 20 when engaged by snap and lock connectors, fasteners, buckles, or the like. A typical example of the normal operation of the seat belt 38 in vehicles 20 such as automobiles and aircraft is for an occupant of the vehicle to enter the vehicle 20, position himself/herself in a seat or bench, and then fasten the provided seat belt 38 from one side of their body across their lap and also perhaps across the front of their body from the shoulder to their hip into a receptacle that will hold the seat belt 38 securely, even if the vehicle 20 is involved in a violent jarring or collision.

The seat belt sensor 30 can include position transducers to establish whether the seat belt 38 is fastened and the length of seat belt 38 that has been pulled out. For example, a potentiometer can translate a change in the physical position of an object into an electrical signal that can be magnified and interpreted by the control module 26. A proximity switch or Hall-effect sensor could be used to detect the absence or presence of an object, such as a belt buckle being fully inserted into a receptacle and communicate it through an electrical signal to the control module 22. Also, a light emitter aimed at the seat belt 38 with a reflector on the seat belt 38 and a phototransistor to receive the reflected light could be used to detect if the seat belt 38 is fastened in front of the occupant.

In response to identifying an absence of the auxiliary mode, the method proceeds by monitoring a first vehicle operation mode of the vehicle. In the preferred embodiment, the first vehicle operation mode can include monitoring a mobilization period of time, monitoring a distance traveled by the vehicle, monitoring the speed of the vehicle, or any additional operational characteristic of the vehicle which may require monitoring. The mobilization period of time and the distance traveled by the vehicle are best defined from the initial start of vehicle motion. However, the time period or the distance traveled can also be determined in relation to any desired initial event, such as by an actuation of the vehicle, such as by a starter or an ignition switch.

The method proceeds by having the comparator of the control module compare the first vehicle operation mode to a predetermined first threshold to determine a first incident of the vehicle in response to the first vehicle operation mode exceeding the predetermined first threshold. In the situation where the first vehicle operation mode is a mobilization period of time, the predetermined first threshold includes a predetermined first mobilization period. In the situation where the first vehicle operation mode is a distance traveled by the vehicle, the predetermined first threshold includes a predetermined first distance threshold. In the situation where the first vehicle operation mode is a speed of the vehicle, the predetermined first threshold includes a predetermined first speed threshold.

Once the control module determines the first incident, the control module proceeds to actuate the resistive device 24 in response to both the absence of the auxiliary mode and the first incident to apply a resistance to an operational input of the vehicle. As is well known in the art, vehicles contain at least one occupant input device which requires the occupant to apply an operational input to operate same. These input devices can include an accelerator pedal, a shifter, an on/off button of an electronic device such as a radio, or a volume, or the number of passengers in the vehicle, or operational level control to establish an operational mode such as an air-conditioning fan speed, or an audible level of the radio. Accordingly, the applied resistance is an application of resistance to these types of operational inputs to affirmatively encourage the occupant to comply with the desired auxiliary mode. For example, the movement of the shifter may be blocked, the depressing of the accelerator pedal may be met with resistance, or the adjusting of a volume or operation level control may be met with greater resistance. Additional examples could also include visual or audio alarms.

The following example illustrates the method wherein the operational input device is an accelerator and the auxiliary mode is the fastening of a seat belt. In normal operation, for example, the occupant enters the vehicle 20 and fastens the seat belt 38 before operating the vehicle 20 beyond the first threshold, which may be a relatively low vehicle speed. In this case, no resistance is applied to the application of force to the accelerator 36. However, if the occupant operates the vehicle 20 beyond the first threshold speed without having the seat belt 38 fastened or fastened and disposed about him, then the occupant will need to apply more force to the accelerator 36 to achieve the desired vehicle speed.

The resistance to the operational input may be applied by a spring, a fluid damper, or a stepper motor with a rack and pinion, or a system using a combination of those. Resistance could be actuated or removed on a spring-type system by either a hydraulic cylinder or a motor and gear system moving the anchor point of the spring from a home position where the spring offers little or no resistance to positions of increased spring tension, providing higher resistance. In a damper type, the amount of incompressible fluid in the reservoir could be increased or decreased using a fluid pump and valves to change the amount of resistance.

In response to actuating the resistance device, the method proceeds by monitoring a second vehicle operation mode of the vehicle subsequent to the first incident and adjusting the applied resistance in proportion to the second vehicle operation mode. Said another way, as the occupant ignores the initial applied resistance, the resistance becomes proportionally more insistent or resistance in response to the second vehicle operation mode. Accordingly, the resistance can be applied in a linear, positive exponential or negative exponential function as related to the second vehicle operation mode. The step of monitoring the second vehicle operation mode could include monitoring the distance traveled by the vehicle, monitoring the speed or acceleration of the vehicle, or monitoring the time of vehicle mobilization. In addition, the first vehicle operation mode could also be the same as the second vehicle operation mode. Of course, any other additional operational modes of the vehicle could be utilized, as desired. The comparator of the control module then sends a signal to the resistive device and increases or adjusts the applied resistance in proportion to the second vehicle operation mode. As previously mentioned, this step is advantageous because instead of having only one applied resistance that is applied at the same continuous level along with the first incident to encourage compliance with the auxiliary mode, the resistance can proportionally be adjusted in response to the second operation mode until an adequate encouragement is reached that is effective for each particular occupant.

If at any time following application of the resistance device, the control module senses an initiation of the auxiliary mode, such as for example the buckling of the seat belt, the control module can initiate removal of resistance applied to the operational input of force. However, it is important to note that removal of the resistance to the application of the operational input is prevented until the auxiliary mode is established. In addition, once the resistance is removed, it is done so gradually to prevent a sudden acceleration of the vehicle. At this point, it should be understood that the method provides an incentive for compliance with the auxiliary mode and thus helps to accomplish safe operation of the vehicle 20 by the occupant. In addition, the method continually monitors for an absence of the auxiliary mode during mobilization of the vehicle. Said another way, if the vehicle is initially operated with the auxiliary mode established, and thus the resistance is not applied, if the auxiliary mode is later disengaged during vehicle mobilization, then the resistance can be applied if the first operating mode also meets exceeds the first predetermined threshold.

To reiterate, in the subject method, the control module would not react or apply the resistance unless the vehicle was being operated potentially unsafely, and then the response would be variable. In other words, when the resistance is applied, it is not simply on or off, but instead will continuously adjust based on the occupant to provide more encouragement. Said another way, as the auxiliary mode over time, the resistance becomes proportionally more insistent or resistant.

A considerable limitation found in the prior art is that the suggested operating conditions are rigid and do not adapt to the behavior of the occupant. For example, when the desired operating conditions do not adjust, the occupants learn and exploit the system, undermining the encouragement method, and possibly operating the vehicle too often under what would otherwise be safe conditions. Accordingly, in an additional embodiment, the predetermined thresholds can also be adjusted, even in situations where they are met. Alternatively, when an occupant is disinclined to follow the desired operating conditions, the encouragement will be actuated sooner than otherwise.

Figure 3:
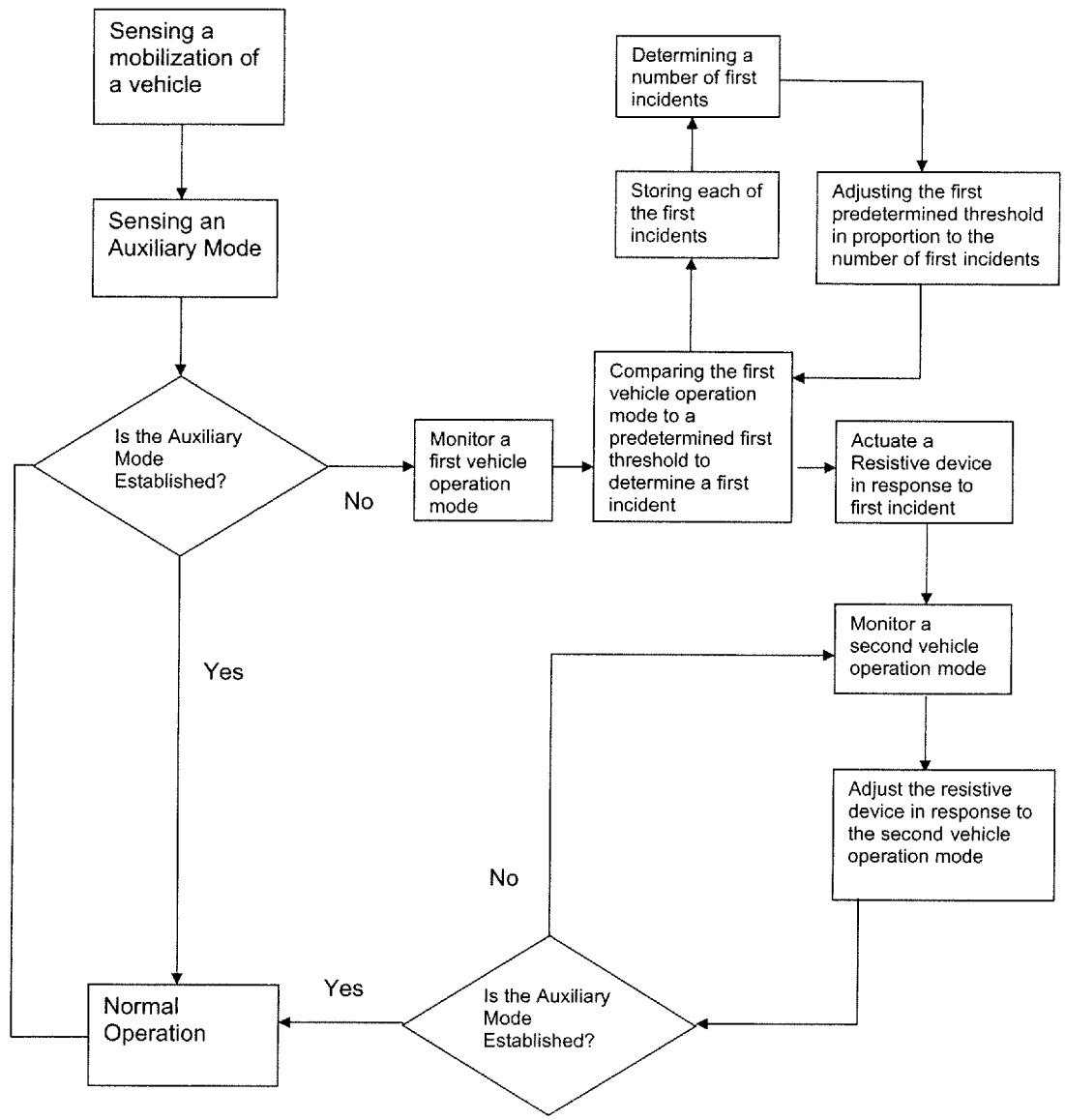
FIG. 3 is a flow diagram of an additional embodiment of the method which illustrates adjusting a first predetermined threshold in proportion to a number of the first incidents.

Accordingly, as illustrated in FIG. 3, the method can also proceed by storing each of the first incidents in the control module and then determine and store a number of first incidents. The first incidents can be determined over a life of the vehicle, can be associated with a particular occupant, or can also be determined after each instance of vehicle mobilization. In any application, the first predetermined threshold can be adjusted in proportion to the number of first incidents. For example, in the situation where the first operation mode is a speed and the predetermined first threshold is a predetermined speed threshold, the control module stores the number of times the vehicle speed exceeds the predetermined first speed threshold while also storing in the control module 22 the number of first incidents in which the operational mode of vehicle speed exceeds the first predetermined speed threshold in the absence of the auxiliary mode. To further illustrate the example, if the first predetermined speed threshold is ten miles per hour (mph), the control module 22 will store the number of times this speed threshold is exceeded in conjunction with the absence of the auxiliary mode. The predetermined first threshold can then be adjusted over time to increase or decrease the threshold based on an occupant's tendency to operate a vehicle above the threshold without the auxiliary mode. For example, if the occupant often operates the vehicle above the threshold in the absence of the auxiliary mode, the threshold could be lowered to apply the resistance at an earlier point of vehicle operation in an attempt to encourage compliance for that particular occupant. Said another way, if the occupant frequently travels above the threshold speed without the seat belt fastened, instead of not encountering the resistance until twenty-five mph, the occupant will start experiencing the resistance at even lower speeds.

Figure 4:
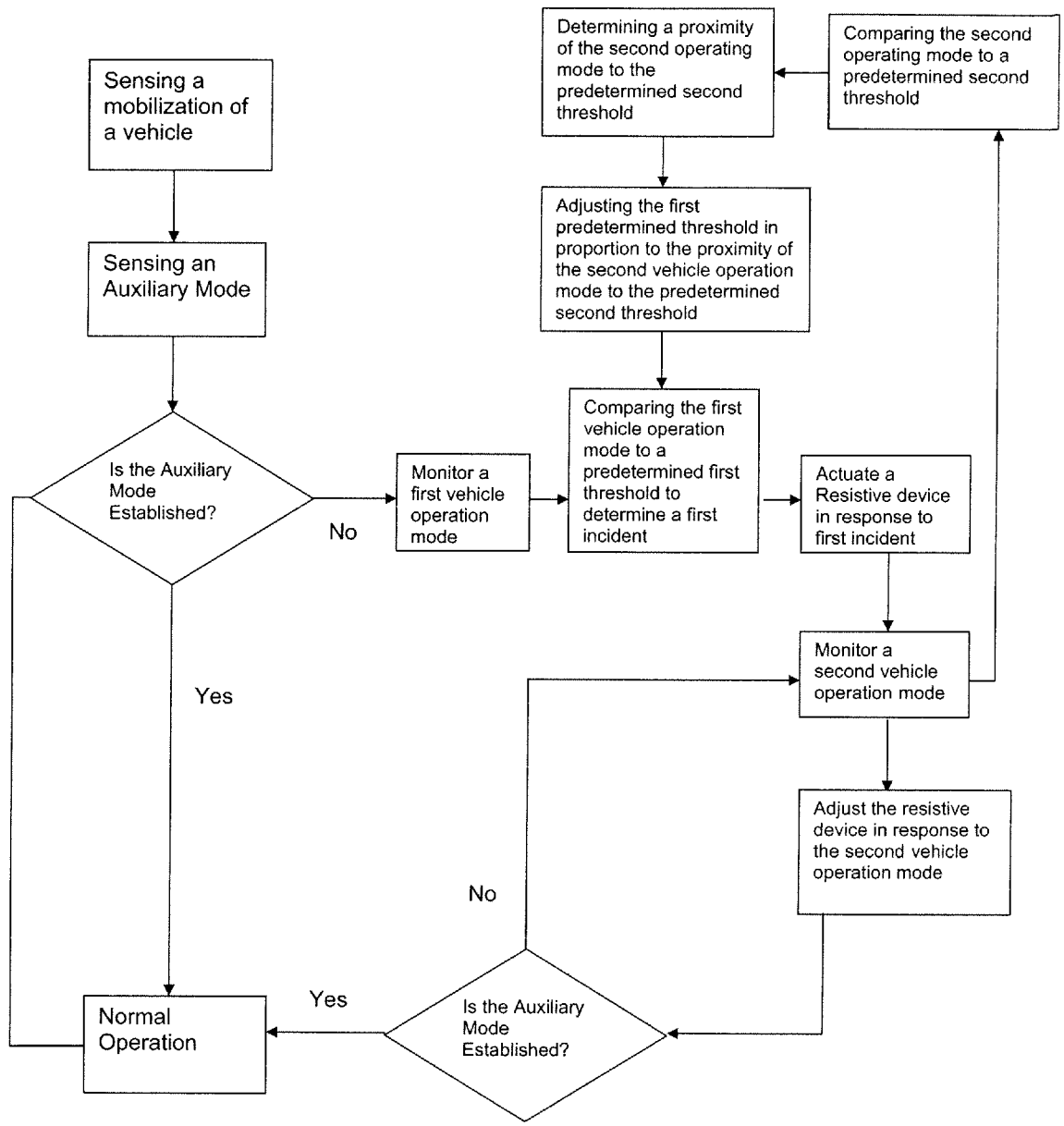
FIG. 4 is a flow diagram of an additional embodiment of the method which illustrates adjusting the first threshold in proportion to the proximity of the second vehicle operation mode to a predetermined second threshold.

Perhaps even more useful, is that if the vehicle is operated too much under conditions that would normally be acceptable, the conditions under which the encouragement occurs can adjust. For example, if the established threshold speed is twenty mph, normally operating the vehicle under twenty mph without the seat belt fastened may be acceptable. However, when the vehicle is operated at seventeen or eighteen mph for long periods of time without the seat belt being fastened, the vehicle will encourage the occupant to fasten the seat belt at speeds even lower than twenty mph, such as fifteen or sixteen mph. Accordingly, in an additional embodiment, as best illustrated in FIG. 4, the method can also include comparing the second operating mode to a predetermined second threshold to determine a proximity of the second vehicle operating mode to the predetermined second threshold, and then adjusting the predetermined first threshold in response to the proximity of the second vehicle mode to the predetermined second threshold. This step is advantageous because the first predetermined threshold can also be adjusted in response to conditions that do not normally violate the desired operating conditions but nonetheless may be undesired. Said another way, the first predetermined threshold can be adjusted over time, or during each particular vehicle mobilization, to capture those conditions in which an occupant may be attempting to avoid the adjustment of resistance to the operational input by operating the vehicle at a condition slightly below the threshold required to trigger adjustment of the applied resistance. For example, wearing a seat belt 38 may be discretionary as long as the vehicle 20 does not exceed seventeen mph. However, operating the vehicle 20 at fifteen mph for an extraordinary amount of time may result in encouragement for the occupant to wear the seat belt 38, even though the vehicle 20 is being operated below seventeen mph. In another example, the length of time a threshold (besides the first threshold, and which perhaps is encountered before the first threshold) is exceeded in the absence of the auxiliary mode is compared with the length of time the vehicle 20 is operated above this threshold, and the first threshold is adjusted proportionally. As previously mentioned, the second vehicle operation mode can include monitoring the distance traveled by the vehicle, monitoring the speed or acceleration of the vehicle, or monitoring the time of vehicle mobilization. Accordingly, the second predetermined threshold can include a predetermined second distance threshold, a predetermined second speed or acceleration threshold or a predetermined second mobilization threshold.

Figure 5:
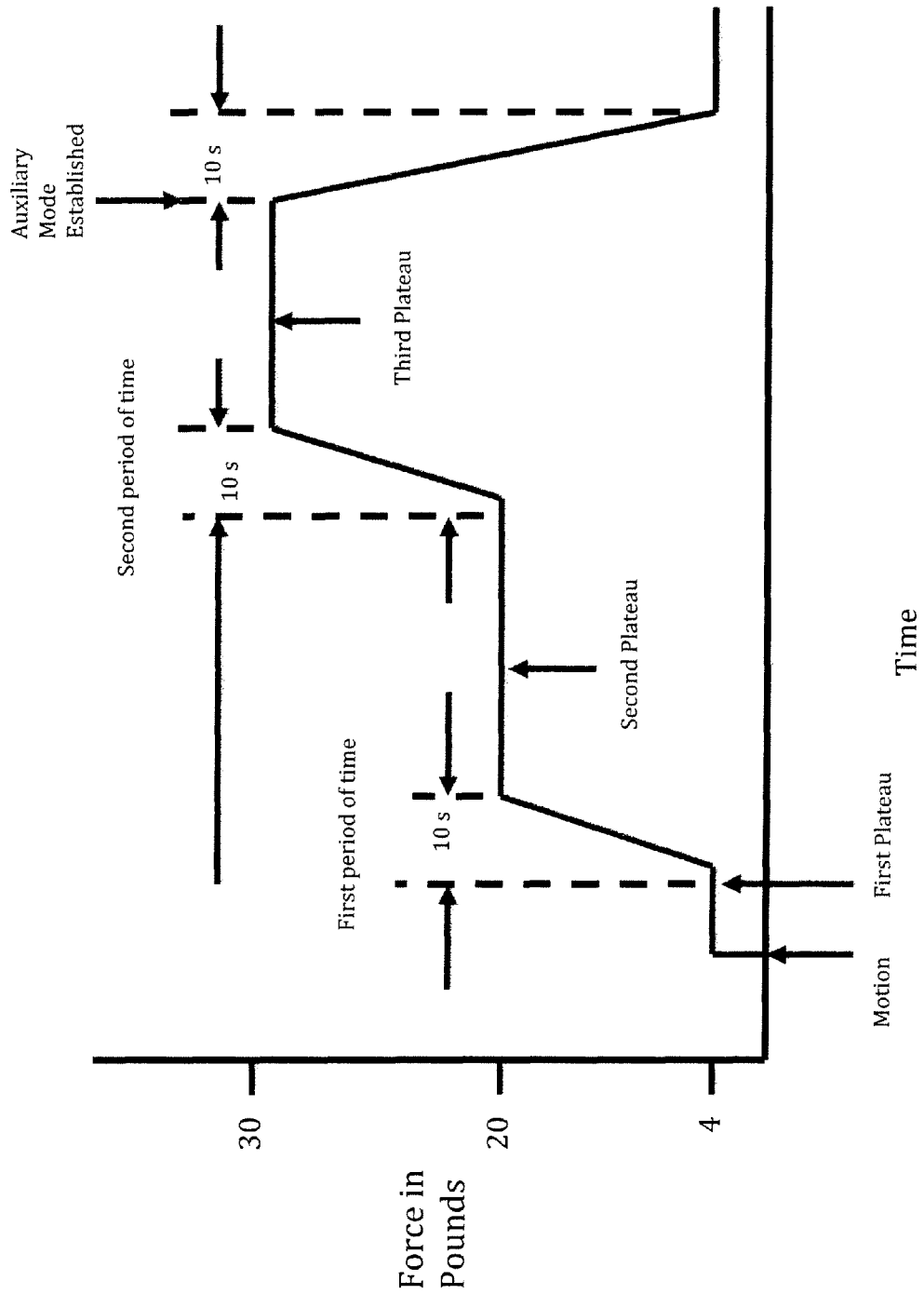
FIG. 5 is a chart of an additional embodiment of the method which illustrates establishing a time associated with the first incident and adjusting the applied resistance in proportion to a first period of time since the first incident.

In an additional embodiment, as best illustrated in FIG. 5, the method can also include establishing a first time incident associated with the first incident and sensing a continued absence of the auxiliary mode since the first time incident. Said another way, a day and/or time associated with the first incident is stored in the control module so that a continued absence of the auxiliary mode following the first incident can be tracked. Accordingly, the step of monitoring a second vehicle operating mode can include monitoring a first period of time since the first incident in response to the continued absence of the auxiliary mode. In addition, the step of adjusting the applied resistance includes adjusting the applied resistance in proportion to the first period of time, i.e. accumulated time, since the first incident. As set forth above, the monitoring of the first vehicle operation mode can include monitoring a speed or acceleration of the vehicle, a time of vehicle mobilization or a distance traveled by the vehicle, and comparing the monitored first vehicle operation mode to the predetermined first threshold to initially determine the first incident.

As best shown in FIG. 5, the method introduces the applied resistance slowly to a first plateau after the first incident. In this situation, the applied force may be sufficient to motivate some occupants to establish the auxiliary mode. However, if the auxiliary mode is not established within a predetermined first period of time, the applied resistance is adjusted up to a second plateau. As mentioned previously, this adjustment to the first plateau could include a linear, positive exponential or negative exponential function as related to the second vehicle operation mode. The method then proceeds by sensing a continued absence of the auxiliary mode since the step of adjusting the applied resistance and then monitoring a second period of time since the first time incident in response to the continued absence of the auxiliary mode. The applied resistance is then further adjusted in proportion to the second period of time. In other words, as best shown in FIG. 5, if the occupant does not establish the auxiliary mode within a second predetermined period of time, the applied resistance is again ramped or adjusted up to a third plateau level. As a result of a variety of plateau levels to determine the applied resistance, the method allows for the applied resistance to be adjusted to accommodate a variety of occupants who have different tolerance levels for encouraging compliance with the auxiliary mode. In addition, the plateau levels ensure that the applied resistance is introduced in a safe and measured manner without compromising efficacy, and also keeps the occupant in complete control of the vehicle.

In an additional embodiment, the method can include detecting an absence of the first incident but also monitoring a third vehicle operating mode of the vehicle. The method proceeds by comparing the third vehicle operating mode to a predetermined override threshold to determine an override incident in response to the third vehicle operating mode exceeding the override threshold. As in the previous methods, the third vehicle operating mode can include monitoring the distance traveled by the vehicle, monitoring the speed or acceleration of the vehicle, or monitoring the time of vehicle mobilization. Accordingly, the override threshold can also include an override distance threshold, an override speed or acceleration threshold or an override mobilization threshold. In addition, the third vehicle operation mode can be the same as one or more of the first and second vehicle operation modes.

The method then proceeds by actuating the resistive device in response to the absence of the auxiliary mode and the absence of the first incident and the override incident. The method proceeds by monitoring the second vehicle operation mode subsequent to the override incident and actuating the applied resistance in proportion to the second vehicle operation mode. For example, in the situation where the first vehicle operation mode is a mobilization period of time and the third vehicle operation mode is a speed of the vehicle, if the car accelerates to, for example, 25 mph in a extreme short period of time which would not otherwise be a mobilization period of time sufficient to trigger the application of resistance, the override threshold can be set at 20 mph such that in this situation where the 25 mph speed would exceed the override threshold to establish an override incident. Accordingly, the resistance would then be applied in response to the override incident, instead of the first incident (which has not yet been established).

In any of the embodiments disclosed above, the control module 22 actuates the resistive device 24 to remove the resistance to the application of the operational input of force to the accelerator 36 in the presence of the auxiliary mode. However, the removal of the resistance to the application of the operational input of force to the accelerator 36 can be prevented until the operational mode of vehicle speed falls below a second predetermined threshold. In other words, the resistance is removed when the occupant satisfies the auxiliary mode or the desired operating conditions. As mentioned previously, in the seat belt 38 and accelerator 36 example, the resistance applied to the application of the accelerator 36 will be removed once the seat belt 38 is fastened and other desired operating conditions are met. For vehicle safety, it may not be safe for the occupant to fasten the seat belt 38 until an operational mode such as vehicle speed is below a predetermined threshold. This is a great advantage in vehicles 20 where an occupant's appendages must remain on vehicle 20 operational inputs or disposed in some other way to maintain safety. The occupant is encouraged so that the vehicle 20 complies with desired operating conditions, but not in a way that can cause greater harm or danger.

Obviously, many modifications and variations of the present invention are possible in light of the above teachings. The invention maybe practiced otherwise than as specifically described within the scope of the appended claims, wherein that which is prior art is antecedent to the novelty set forth in the "characterized by" claims. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty has utility. In addition, the reference numerals in the claims are merely for convenience and are not to be read in any way as limiting.

What is claimed is:

1. A method of controlling the behavior of an occupant of a vehicle with a resistive device and a control module and sensors to encourage compliance with an auxiliary mode, and comprising the steps of:
    sensing a mobilization of the vehicle,
    sensing an auxiliary mode of the vehicle in response to the vehicle mobilization to identify an absence of the auxiliary mode,
    monitoring a first vehicle operation mode of the vehicle,
    comparing the first vehicle operation mode to a predetermined first threshold to determine a first incident of the vehicle in response to the first vehicle operation mode exceeding the predetermined first threshold,
    actuating the resistive device in response to the absence of the auxiliary mode and the first incident to apply a resistance to an operational input of the vehicle, and
    characterized by monitoring a second vehicle operation mode of the vehicle subsequent to the first incident and adjusting the applied resistance in proportion to the second vehicle operation mode.

2. A method as set forth in claim 1 further comprising:
    wherein the step of monitoring the first vehicle operation mode includes monitoring a mobilization period of time of the vehicle; and
    wherein the step of comparing the first vehicle operation mode includes comparing the mobilization period of time to a predetermined first mobilization threshold to determine the first incident.

3. A method as set forth in claim 2 further comprising:
    wherein the step of monitoring the second vehicle operation mode includes monitoring a speed of the vehicle with a first sensor; and
    wherein the step of adjusting the applied resistance includes adjusting the applied resistance in proportion to the speed of the vehicle.

4. A method as set forth in claim 2 further comprising:
    wherein the step of monitoring the second vehicle operation mode includes monitoring a distance traveled by the vehicle; and
    wherein the step of adjusting the applied resistance includes adjusting the applied resistance in proportion to the traveled distance.

5. A method as set forth in claim 2 further comprising:
    wherein the step of monitoring the second vehicle operation mode includes monitoring an acceleration of the vehicle; and
    wherein the step of adjusting the applied resistance includes adjusting the applied resistance in proportion to the vehicle acceleration.

6. A method as set forth in claim 1 further comprising:
    wherein the step of monitoring the first vehicle operation mode includes monitoring a distance traveled by the vehicle; and
    wherein the step of comparing the first vehicle operation mode includes comparing the distance traveled by the vehicle to a predetermined first distance threshold to determine the first incident.

7. A method as set forth in claim 6 further comprising:
    wherein the step of monitoring the second vehicle operation mode includes monitoring a speed of the vehicle with a first sensor; and
    wherein the step of adjusting the applied resistance includes adjusting the applied resistance in proportion to the speed of the vehicle.

8. A method as set forth in claim 6 further comprising:
    wherein the step of monitoring the second vehicle operation mode includes monitoring a mobilization period of time of the vehicle; and
    wherein the step of adjusting the applied resistance includes adjusting the applied resistance in proportion to the mobilization period.

9. A method as set forth in claim 6 further comprising:
    wherein the step of monitoring the second vehicle operation mode includes monitoring an acceleration of the vehicle; and
    wherein the step of adjusting the applied resistance includes adjusting the applied resistance in proportion to the vehicle acceleration.

10. A method as set forth in claim 1 further comprising:
    wherein the step of monitoring the first vehicle operation mode includes monitoring the speed of the vehicle with a first sensor; and
    wherein the step of comparing the first vehicle operation mode includes comparing the vehicle speed to a predetermined first speed threshold to determine the first incident.

11. A method as set forth in claim 10 further comprising:
    wherein the step of monitoring the second vehicle operation mode includes monitoring an acceleration of the vehicle; and
    wherein the step of adjusting the applied resistance includes adjusting the applied resistance in proportion to the vehicle acceleration.

12. A method as set forth in claim 10 further comprising:
    wherein the step of monitoring the second vehicle operation mode includes monitoring a mobilization period of time of the vehicle; and
    wherein the step of adjusting the applied resistance includes adjusting the applied resistance in proportion to the speed of the vehicle.

13. A method as set forth in claim 10 further comprising:
    wherein the step of monitoring the second vehicle operation mode includes monitoring a distance traveled by the vehicle; and
    wherein the step of adjusting the applied resistance includes adjusting the applied resistance in proportion to the traveled distance.

14. A method as set forth in claim 1 further comprising the steps of:
    storing each of the first incidents in the control module;
    determining a number of first incidents; and
    adjusting the first predetermined threshold in proportion to the number of first incidents.

15. A method as set forth in claim 1 further comprising the steps of:
    comparing the second vehicle operating mode to a predetermined second threshold to determine a proximity of the second vehicle operating mode to the predetermined second threshold; and
    adjusting the predetermined first threshold in response to the proximity of the second vehicle operating mode to the predetermined second threshold.

16. A method as set forth in claim 1 further comprising the steps of:
    establishing a first time incident associated with the first incident,
    sensing a continued absence of the auxiliary mode since the first time incident, wherein the step of monitoring a second vehicle operating mode includes monitoring a first period of time since the first incident in response to the continued absence of the auxiliary mode, and wherein the step of adjusting the applied resistance includes adjusting the applied resistance in proportion to the first period of time since the first incident.

17. A method as set forth in claim 16 further comprising:

wherein the step of monitoring the first vehicle operation mode includes monitoring a mobilization period of time of the vehicle; and wherein the step of comparing the first vehicle operation mode includes comparing the mobilization period of time to a predetermined first mobilization threshold to determine the first incident.

18. A method as set forth in claim 16 further comprising:

wherein the step of monitoring the first vehicle operation mode includes monitoring a distance traveled by the vehicle; and wherein the step of comparing the first vehicle operation mode includes comparing the distance traveled by the vehicle to a predetermined first distance threshold to determine the first incident.

19. A method as set forth in claim 16 further comprising:

wherein the step of monitoring the first vehicle operation mode includes monitoring the speed of the vehicle with a first sensor; and wherein the step of comparing the first vehicle operation mode includes comparing the vehicle speed to a predetermined first speed threshold to deter mine the first incident.

20. A method as set forth in claim 16 further comprising:

wherein the step of monitoring the first vehicle operation mode includes monitoring an acceleration of the vehicle; and wherein the step of comparing the first vehicle operation mode includes comparing the vehicle speed to a predetermined first acceleration threshold to determine the first incident.

21. A method as set forth in claim 16 further comprising the steps of:

sensing a continued absence of the auxiliary mode since the step of adjusting the applied resistance, monitoring a second period of time since the first time incident in response to the continued absence of the auxiliary mode; and further adjusting the applied resistance in proportion to the second period of time.

22. A method as set forth in claim 1 further comprising the steps of:

detecting an absence of the first incident;

monitoring a third vehicle operating mode of the vehicle;

comparing the third vehicle operating mode to a predetermined override threshold to determine an override incident in response to the third vehicle operating mode exceeding the override threshold;

actuating the resistive device in response to the absence of the auxiliary mode and the absence of the first incident and the override incident; and monitoring the second vehicle operating mode subsequent to the override incident and actuating the applied resistance in proportion to the second vehicle operating mode.

23. A method as set forth in claim 1 wherein the auxiliary mode of the vehicle is a fastening of a seat belt associated with the occupant of the vehicle.

24. A method as set forth in claim 1 wherein the operational input is an operational input of force to an accelerator pedal of the vehicle.

25. A method as set forth in claim 1 further comprising the step of removing the applied resistance in response to a detected presence of the auxiliary mode.

* * * * *

UNITED STATES PATENT AND TRADEMARK OFFICE
CERTIFICATE OF CORRECTION

| | | |
|---|---|---|
| PATENT NO. | : 8,255,124 B2 | Page 1 of 1 |
| APPLICATION NO. | : 13/408399 | |
| DATED | : August 28, 2012 | |
| INVENTOR(S) | : Van Houten et al. | |

It is certified that error appears in the above-identified patent and that said Letters Patent is hereby corrected as shown below:

Column 11, Line 31

In claim 19, "deter mine" should read -- determine --.

Signed and Sealed this
Ninth Day of October, 2012

David J. Kappos
*Director of the United States Patent and Trademark Office*